(12) United States Patent
Le

(10) Patent No.: US 11,309,959 B2
(45) Date of Patent: Apr. 19, 2022

(54) DIRECT-DETECTION OPTICAL RECEIVER CAPABLE OF SIGNAL-TO-SIGNAL BEAT INTERFERENCE CANCELLATION

(71) Applicant: Nokia Solutions and Networks OY, Espoo (FI)

(72) Inventor: Thai Son Le, Aberdeen, NJ (US)

(73) Assignee: NOKIA SOLUTIONS AND NETWORKS OY, Espoo (FI)

(\*) Notice: Subject to any disclaimer, the term of this patent is extended or adjusted under 35 U.S.C. 154(b) by 0 days.

(21) Appl. No.: 16/890,268

(22) Filed: Jun. 2, 2020

(65) Prior Publication Data

US 2021/0376926 A1    Dec. 2, 2021

(51) Int. Cl.
   *H04B 10/079*    (2013.01)
   *H04B 10/60*    (2013.01)

(52) U.S. Cl.
   CPC ......... *H04B 10/0795* (2013.01); *H04B 10/60* (2013.01)

(58) Field of Classification Search
   CPC ........................... H04B 10/0795; H04B 10/60
   USPC ................................... 398/202, 203, 206, 25
   See application file for complete search history.

(56) References Cited

U.S. PATENT DOCUMENTS

| | | | |
|---|---|---|---|
| 6,485,872 B1 | 11/2002 | Rosenthal et al. | |
| 7,123,402 B1 | 10/2006 | Doerr et al. | |
| 7,526,211 B2 | 4/2009 | Mcnicol et al. | |
| 8,693,886 B2 | 4/2014 | Kikuchi | |
| 8,842,997 B2 | 9/2014 | Liu et al. | |
| 9,209,908 B2 | 12/2015 | Yu et al. | |
| 9,621,391 B2 * | 4/2017 | Chen ................. | H04B 10/6971 |
| 10,404,400 B2 | 9/2019 | Chen et al. | |
| 2003/0072060 A1 | 4/2003 | Sourani | |
| 2003/0189745 A1 | 10/2003 | Kikuchi et al. | |
| 2008/0234489 A1 | 9/2008 | Brasch et al. | |
| 2009/0074428 A1 | 3/2009 | Liu | |
| 2010/0110426 A1 | 5/2010 | Cicerone et al. | |

(Continued)

OTHER PUBLICATIONS

Li et al; Signal-signal beat interference cancellation in spectrally-efficient WDM direct-detection Nyquist-pulse-shaped 16-QAM subcarrier modulation; Sep. 2015; Optical Society of America; pp. 1-16. (Year: 2015).*

(Continued)

*Primary Examiner* — Amritbir K Sandhu
(74) *Attorney, Agent, or Firm* — Mendelsohn Dunleavy, P.C.; Yuri Gruzdkov; Steve Mendelsohn

(57) ABSTRACT

A direct-detection optical data receiver capable of low-latency SSBI cancellation using one or more FIR filters in the chain of digital signal processing thereof. In an example embodiment, a DSP of the receiver may have first and second serially connected FIR filters whose filter coefficients are updated based on a same feedback signal. An SSBI-cancellation circuit of the DSP is configured to estimate the SSBI by summing a scaled square of the filtered signal generated by the first FIR filter and a scaled square of the filtered signal generated by the second FIR filter. In some embodiments, the SSBI-cancellation circuit may have two or more serially connected stages, each of which incrementally improves the accuracy of the SSBI estimate. In some embodiments, the need for dedicated and/or specialized filter-calibration procedures may beneficially be circumvented.

20 Claims, 8 Drawing Sheets

(56) References Cited

U.S. PATENT DOCUMENTS

| | | | |
|---|---|---|---|
| 2011/0097075 | A1 | 4/2011 | Tanimura et al. |
| 2013/0259490 | A1 | 10/2013 | Malouin et al. |
| 2015/0071656 | A1 | 3/2015 | Oyama et al. |
| 2015/0257986 | A1 | 9/2015 | Sun et al. |
| 2016/0112123 | A1 | 4/2016 | Chen et al. |
| 2016/0127049 | A1* | 5/2016 | Randel ............... H04B 10/5165 398/115 |
| 2016/0212003 | A1* | 7/2016 | Chen ................. H04L 25/03343 |
| 2018/0294913 | A1 | 10/2018 | Chen et al. |
| 2019/0089479 | A1* | 3/2019 | Yamauchi ............... H04J 14/06 |
| 2020/0028592 | A1* | 1/2020 | Chen ...................... H04B 10/69 |

OTHER PUBLICATIONS

Li et al; Simplified DSP-based signal-signal beat interference mitigation for direction detection subcarrier modulation; 2016; OFC; pp. 1-3. (Year: 2016).*

Li et al; SSBI Mitigation and the Kramers-Kronig Scheme in Single-Sideband Direct-Detection Transmission With Receiver-Based Electronic Dispersion Compensation; May 2017; Journal of Lightwave Technology vol. 35, No. 10; pp. 1-7. (Year: 2017).*

Li et al; Simplified DSP-Based Signal-Signal Beat Interference Mitigation for Direct-Detection Subcarrier Modulation; 2016; Optical society of America; pp. 1-7. (Year: 2016).*

Li et al; Digital Linearization of Direct-Detection Transceivers for Spectrally Efficient 100 Gb/s/λ WDM Metro Networking; Journal of Lightwave Technology vol. 36, Jan. 2018; pp. 1-10. (Year: 2018).*

Li et al; Simplified DSP-Based Signal-Signal Beat Interference Mitigation for Direct-Detection Subcarrier Modulation; 2016; Optical Society of America; pp. 1-3. (Year: 2016).*

Li et al; SSBI Mitigation and the Kramers-Kronig Scheme in Single-Sideband Direct-Detection Transmission With Receiver-Based Electronic Dispersion Compensation; May 2017; Journal of lightwave technology; p. 1-7. (Year: 2017).*

Li et al; Digital Linearization of Direct-Detection Transceivers for Spectrally Efficient 100 Gb/s/λ WDM Metro Networking; Jan. 2018; Journal of Lightwave Technology; pp. 1-10. (Year: 2018).*

"Fiber Optical Transmission Systems," www.springer.com, 2012 [retrieved on Apr. 13, 2017] Retrieved from the Internet: <URL: http://www.springer.com/cda/content/document/cda_downloaddocument/9783642210549-c2.pdf?SGWID=0-0-45-1246859-p174123873 (20 pages).

Che, Di, et al., "Stokes Vector Direct Detection for Linear Complex Optical Channels," 2015, Journal of Lightwave Technology, vol. 33, No. 3, pp. 678-684.

Chen, X., et al., "High-speed Fading-free Direct Detection for Double-Sideband OFDM Signal via Block-wise Phase Switching," Optical Fiber Communication Conference and Exposition and the National Fiber Optic Engineers Conference (OFC/NFOEC), 2013 (3 pages).

Matsui, Yasuhiro, et al., "55-GHz Bandwidth Short-Cavity Distributed Reflector Laser and its Application to 112-GB/s PAM-4," OFC Postdeadline Papers OSA, 2016 (3 pages).

Morsy-Osman, Mohamed, et al., "Four-Dimensional Modulation and Stokes Direct Detection of Polarization Division Multiplexed Intensities, Inter Polarization Phase and Inter Polarization Differential Phase," Journal of Lightwave Technology, vol. 34, No. 7, 2016, pp. 1585-1592.

Mecozzi, Antonio, et al., "Kramers-Kronig Coherent Receiver," Optica, vol. 3, No. 11, 2016, pp. 1220-1227.

Yamazaki, Hiroshi, et al., "300-Gbps Discrete Multi-tone Transmission Using Digital-Preprocessed Analog-Multiplexed DAC with Halved Clock Frequency and Suppressed Image," ECOC—Post Deadline 42nd European Conference and Exhibition on Optical Communications, 2016, pp. 25-27.

Taylor, Leonard S., "The Phase Retrieval Problem," IEEE Transactions on Antennas and Propagation, vol. AP-29, No. 2, 1981, pp. 386-391.

Mecozzi, Antonio, "A necessary and sufficient condition for minimum phase and implications for phase retrieval," IEEE Transactions on Information Theory, vol. 13, No. 9, 2014, pp. 1-9.

Savory, Seb J., "Digital filters for coherent optical receivers," Optics Express, vol. 16, Issue 2, 2008, pp. 804-817.

Chen, X., et al. "Frequency-Resolved Measurements of Signal, Noise, and Signal-Signal Beat Interference in Self-Coherent Direct-Detection Receivers." Optical Fiber Communication Conference. Optical Society of America, 2018, 3 pages.

Chen, X., et al. "Kramers-Kronig receivers for 100-km datacenter interconnects." Journal of Lightwave Technology 36.1 (2018): 79-89.

Peng, W., "Experimental Demonstration of a Coherently Modulated and Directly Detected Optical OFDM System Using an RF-Tone Insertion." In Optical Fiber Communication/National Fiber Optic Engineers Conference, IEEE 2008, pp. 1-3.

Peng, W., et al. "Spectrally efficient direct-detected OFDM transmission employing an iterative estimation and cancellation technique." Optics express 17.11 (2009): 9099-9111.

Helder, R., et al. "Mono-objective optimization for direct detection optical OFDM transmissions in short-range links." Journal of Microwaves, Optoelectronics and Electromagnetic Applications (JMOe) 12 (2013): 113-127.

Che, Di, et al., "Linearization of Direct Detection Optical Channels Using Self-Coherent Subsystems." Journal of Lightwave Technology 34.2 (2016): pp. 516-524.

Mecozzi, A., et al. "The Kramers-Kronig receiver."Optical Fiber Communication Conference 2018 OSA,—The Optical Society. (2018) pp. Tu2D-1.

Peng, WR et al., "Enabling high capacity direct-detection optical OFDM transmissions using beat interference cancellation receiver." 36th European Conference and Exhibition on Optical Communication Sep. 19, 2010; (pp. 1-3). IEEE.

Shi, H. et al., "SSBI cancellation based on time diversity reception in SSB-DD-OOFDM transmission systems." CLEO: Applications and Technology Jun. 8, 2014; Optical Society of America, (pp. JTh2A-14).

Zhu, M., et al., "Hilbert superposition and modified signal-to-signal beating interference cancellation for single side-band optical NPAM-4 direct-detection system." Optics express May 29, 2017; vol. 25 Issue 11 (pp. 12622-12631).

Li, Z. et al., "Signal-signal beat interference cancellation in spectrally-efficient WDM direct-detection Nyquist-pulse-shaped 16-QAM subcarrier modulation." Optics express. Sep. 7, 2015; vol. 23 Issue 18 (pp. 23694-23709).

Li, Z. et al. "SSBI mitigation and the Kramers-Kronig scheme in single-sideband direct-detection transmission with receiver-based electronic dispersion compensation." Journal of Lightwave Technology May 15, 2017; vol. 35 Issue 10 (pp. 1887-1893).

Liu, X. et al., "Digital self-coherent detection." Optics Express. Jan. 21, 2008; vol. 16 Issue 2 (pp. 792-803.).

Li, Zhe, et al. "Comparison of digital signal-signal beat interference compensation techniques in direct-detection subcarrier modulation systems." Optics Express 24.25 (2016): 29176-29189.

Erkilinç, M. Sezer, et al. "Performance Comparison of Single-Sideband Direct Detection Nyquist-Subcarrier Modulation and OFDM." Journal of Lightwave Technology 33.10 (2015): 2038-2046.

Hameed, Mahmood Abdul. "Nonlinear Mixing in Optical Multicarrier Systems." Dissertation, University of Kansas (2016): 75 pages.

Li, Zhe, et al. "Simplified DSP-based Signal-Signal Beat Interference Mitigation Technique for Direct Detection OFDM." Journal of Lightwave Technology 34.3 (2015): 866-872.

Pereira, Cátia R. C., "Cancellation of signal-signal beat interference in multi-band orthogonal frequency division multiplexing metropolitan networks employing an electroabsorption modulator", Dissertation, University of Lisbon (2016): 10 pages.

Chen, Xi, et al. "218-Gb/s Single-Wavelength, Single-Polarization, Single-Photodiode Transmission Over 125-km of Standard Singlemode Fiber Using Kramers-Kronig Detection." 2017 Optical Fiber Communication Conference. Optical Society of America, (2017): Th5B.6 (3 pages).

(56) References Cited

OTHER PUBLICATIONS

Le, S. T., et al. "8×256Gbps Virtual-Carrier Assisted WDM Direct-Detection Transmission over a Single Span of 200km." 2017 European Conference on Optical Communication (ECOC). IEEE (2017): 1-3.

Bo, Tianwai, et al. "Kramers-Kronig Receiver Without Digital Upsampling." 2018 Optical Fiber Communications Conference and Exposition (OFC). IEEE (2018): 1-4.

Füllner, Christoph, et al. "Transmission of 80-GBd 16-QAM over 300 km and Kramers-Kronig reception using a low-complexity FIR Hilbert filter approximation." 2018 Optical Fiber Communications Conference and Exposition (OFC). Optical Society of America, Mar. 2018, 3 pages.

Antonelli, Cristian, et al. "Polarization multiplexing with the Kramers-Kronig receiver." Journal of Lightwave Technology 35.24 (2017): 5418-5424.

"Single-sideband modulation", www.wikipedia.org, 2005 [retrieved on Apr. 9, 2020] Retrieved from the Internet: <URL: https://en.wikipedia.org/wiki/Single-sideband_modulation> (6 pages).

Chen, X., et al. "Impact of O/E Front-end Frequency Response on Kramers-Kronig Receivers and its Compensation." 2018 European Conference on Optical Communication (ECOC). IEEE (2018): 1-3.

ITU-T Recommendation G.709/Y.1331 "Interfaces for the optical transport network", Feb. 2012 (2012): 1-227.

Le, Son Thai, et al. "1.72-Tb/s Virtual-Carrier-Assisted Direct-Detection Transmission Over 200 km." Journal of Lightwave Technology 36.6 (2018): 1347-1353.

Li, Xiang, et al. "Direct detection of pilot-assisted PAM-4 signals with large phase noise tolerance." Optics Letters 44.22 (2019): 5457-5460.

Mecozzi, Antonio, et al. "Kramers-Kronig receivers." Advances in Optics and Photonics 11.3 (2019): 480-517.

Mori, Yojiro, et al. "Novel configuration of finite-impulse-response filters tolerant to carrier-phase fluctuations in digital coherent optical receivers for higher-order quadrature amplitude modulation signals." Optics Express 20.24 (2012): 26236-26251.

Hu, Qian et al. "Field Reconstruction for an Optical Receiver." U.S. Appl. No. 16/811,194, filed Mar. 6, 2020 at the USPTO (46 pages).

* cited by examiner

100

130

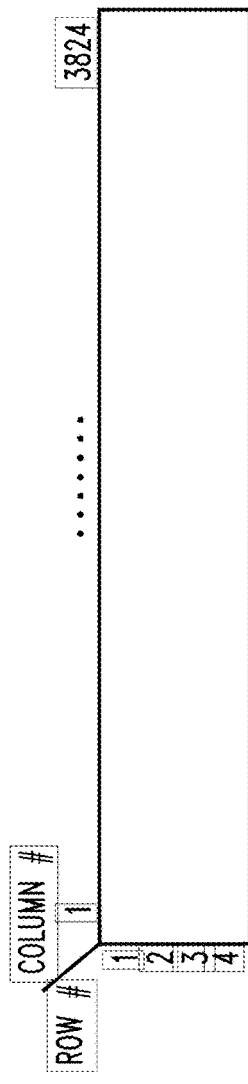
FIG. 7A
ODUk
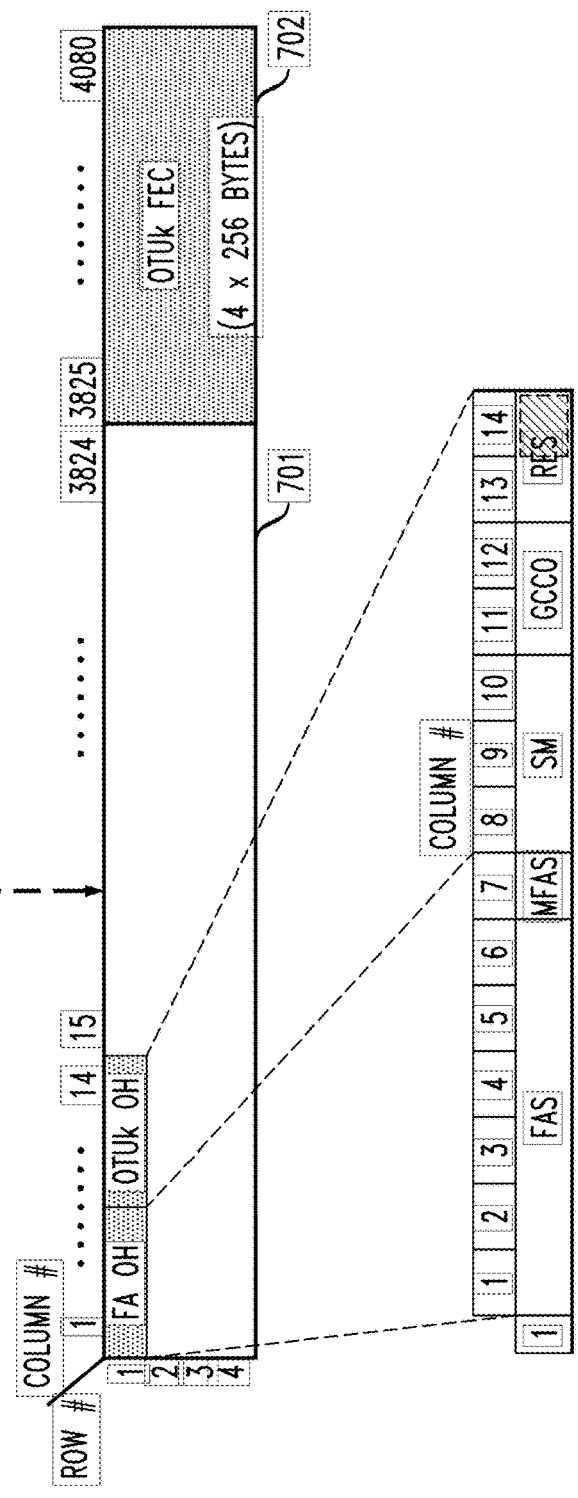
FIG. 7B
OTUk
FIG. 7C
OTU OH

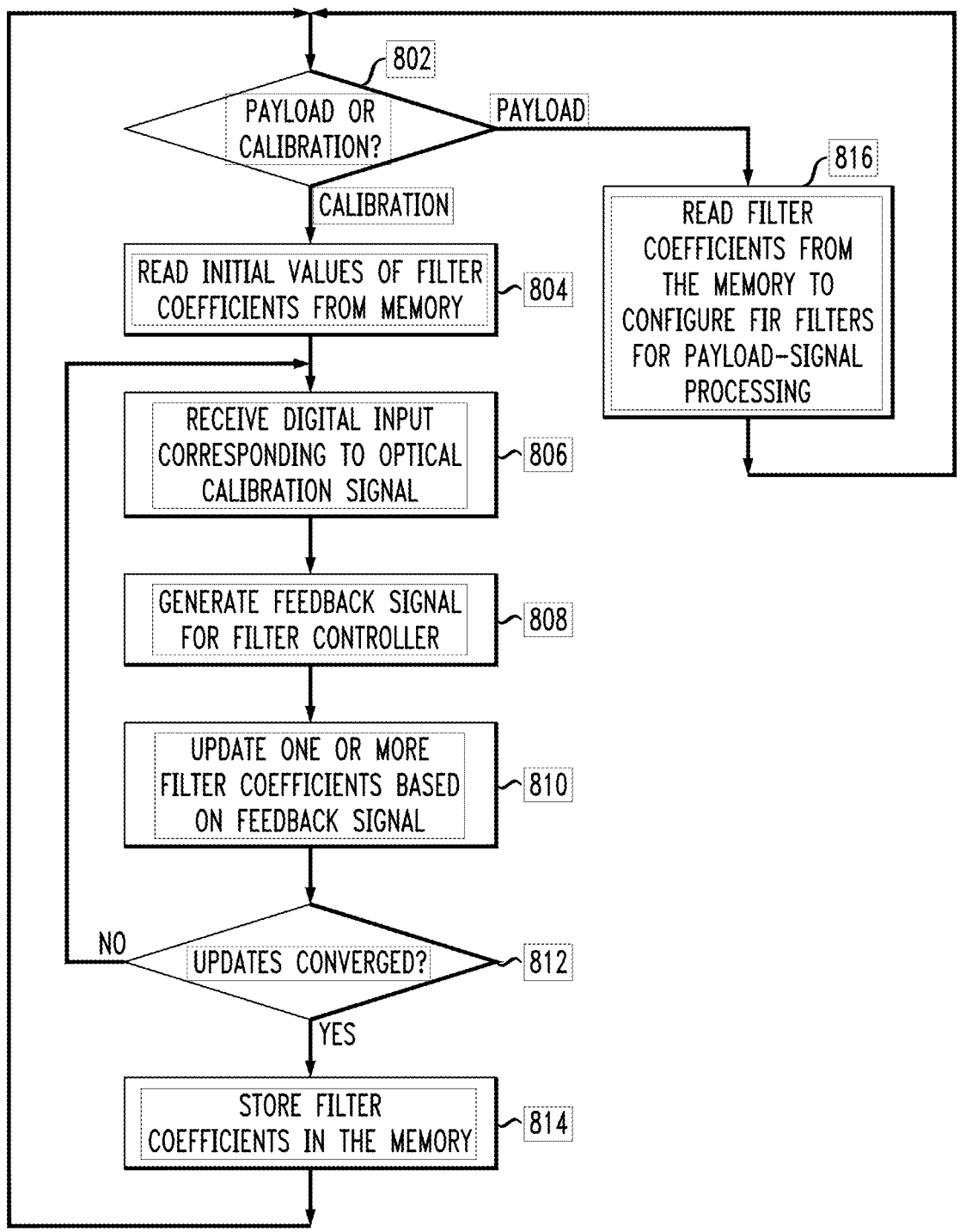

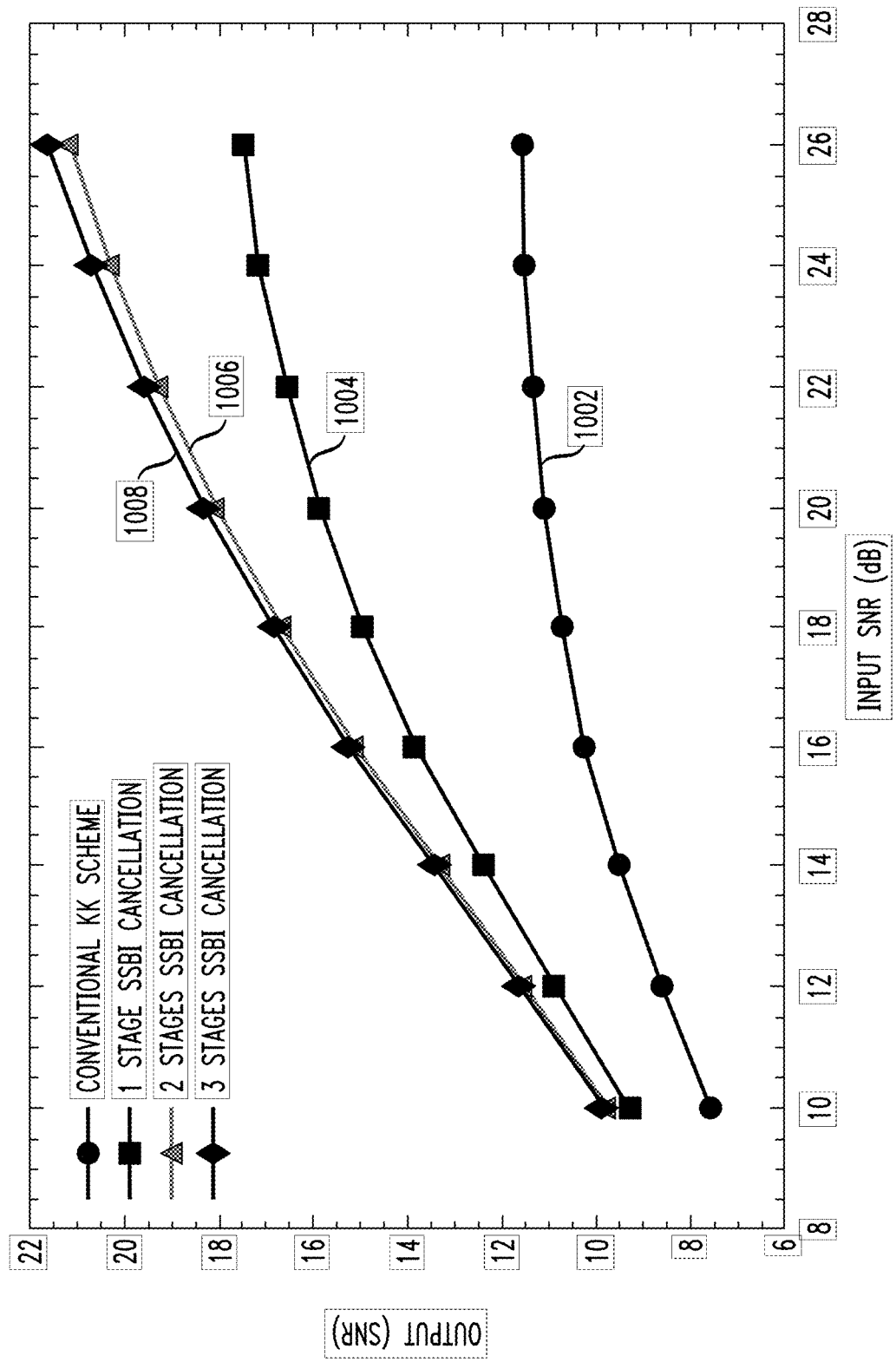

DIRECT-DETECTION OPTICAL RECEIVER CAPABLE OF SIGNAL-TO-SIGNAL BEAT INTERFERENCE CANCELLATION

BACKGROUND

Field

Various example embodiments relate to optical communication equipment and, more specifically but not exclusively, to optical transmitters and receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Some optical receivers are capable of detecting not only the amplitude of an optical signal, but also the signal's phase. As a result, the optical field can substantially be reconstructed at the receiver and then be used for signal equalization, e.g., directed at reducing the adverse effects of some optical-link impairments.

SUMMARY OF SOME SPECIFIC EMBODIMENTS

Disclosed herein are various embodiments of a direct-detection optical data receiver capable of low-latency signal-to-signal-beat-interference (SSBI) cancellation using finite-impulse-response (FIR) filters in the chain of digital signal processing thereof. In an example embodiment, a digital signal processor (DSP) of the receiver may have first and second serially connected FIR filters whose filter coefficients are updated based on a same feedback signal. In some embodiments, an SSBI-cancellation circuit of the DSP may be, e.g., configured to estimate the SSBI by summing a scaled square of the filtered digital signal generated by the first FIR filter and a scaled square of the filtered digital signal generated by the second FIR filter. In some embodiments, the SSBI-cancellation circuit may have two or more serially connected stages, each of which incrementally improves the accuracy of the SSBI estimate.

In some embodiments, the low latency of SSBI cancellation can be used to update the FIR filter coefficients using an overhead portion of a received optical frame and then use the FIR filter coefficients so updated to recover payload data from the payload portion of that optical frame. In such embodiments, the need for dedicated and/or specialized filter-calibration procedures may beneficially be circumvented.

According to an example embodiment, provided is an apparatus comprising a direct-detection optical data receiver that comprises: a single-ended photodiode to receive light combining an optical data signal and an optical frequency reference; an analog-to-digital converter to output a sequence of digital intensity measurements of the light received by the single-ended photodiode at a sequence of corresponding times; and a digital signal processor connected to receive the digital intensity measurements, the digital signal processor being configured to recover a data stream carried by the optical data signal from the digital intensity measurements; wherein the digital signal processor comprises a first FIR filter and a digital circuit that comprises a second FIR filter, the second FIR filter being serially connected with the first FIR filter, the first FIR filter being configured to filter the digital intensity measurements, the digital circuit being configured to subtract estimates of SSBI from the digital intensity measurements filtered by the first FIR filter; and wherein the digital signal processor is configured to update filter coefficients of both the first and second FIR filters based on a same feedback signal.

According to another example embodiment, provided is an apparatus comprising a direct-detection optical data receiver that comprises: a photodiode detector; and a digital signal processor connected to receive digital measurements of light by the photodiode detector at a sequence of times, the digital signal processor being configured to recover a data stream of an optical input signal from the digital measurements, each of the measurements measuring a combination of the optical input signal and an optical frequency reference at one of the times; and wherein the digital signal processor comprises a digital circuit that comprises a FIR filter configured to generate a filtered digital signal in response to a digital input signal applied thereto, the digital input signal being applied to the FIR filter in response to the digital measurements, the digital circuit being configured to compute an estimate of SSBI in the digital measurements by summing a scaled square of the filtered digital signal and a scaled square of the digital input signal.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 7A-7C pictorially show a frame structure that can be used in the optical fiber communication system of FIG. 1 according to an embodiment;

FIG. 8 shows a flow chart of a signal-processing method that can be used in the digital filter of FIG. 5 according to an embodiment;

FIG. 10 graphically shows estimated example improvements that may be achieved according to some embodiments.

DETAILED DESCRIPTION

Some embodiments may benefit from some features disclosed in U.S. Patent Application Publication No. 2020/0028592, which is incorporated herein by reference in its entirety.

Some embodiments may benefit from some features disclosed in U.S. patent application Ser. No. 16/811,194, which is incorporated herein by reference in its entirety.

The Kramers-Kronig (KK) algorithm is a conventional field-reconstruction algorithm that may be used in some direct-detection optical receivers. The KK algorithm is reviewed, e.g., in A. Mecozzi, et al., "Kramers-Kronig Coherent Receiver," Optica 3, pp. 1218-1227 (2016), which is incorporated herein by reference in its entirety.

Herein, optical-field reconstruction means determination of phase of an optical signal and optionally amplitude of the optical signal, e.g., average amplitudes and phases for individual signal slots. Such optical-field reconstruction may or may not involve determining the amplitude and phase of both polarization components of the optical signal.

Herein, a direct-detection optical receiver may be configured to receive a data-carrying optical signal and an optical frequency-reference signal (e.g., an optical oscillator) together, e.g., from a remote optical transmitter, and to recover phase-modulated data from the data-carrying optical signal based on interference between the received data-carrying and frequency-reference signals in a light detector. The light detector is configured to measure only light intensities, e.g., the light detector may be a single photodiode rather than a pair of photodiodes configured for differential detection. Also, the optical frequency-reference signal typically has a much narrower bandwidth than the data-carrying optical signal. A direct-detection optical receiver does not typically employ an optical hybrid to determine the phase-modulated data carried by the data-carrying optical signal.

Figure 1:
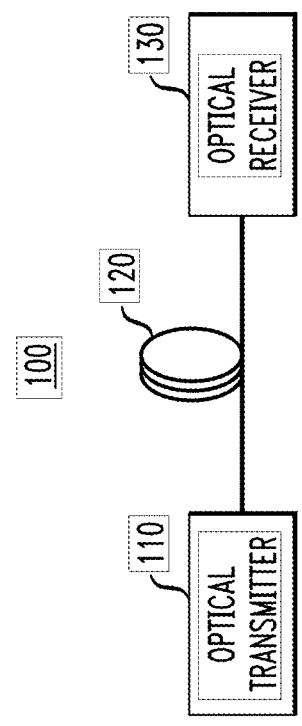
FIG. 1 shows a block diagram of an example optical fiber communication system in which some embodiments may be practiced.

FIG. 1 shows a block diagram of an example optical fiber communication system 100 in which at least some embodiments may be practiced. System 100 comprises an optical data transmitter 110 and an optical data receiver 130 optically connected via an optical fiber communication link 120. In an example embodiment, link 120 comprises one or more spans of optical fiber or fiber-optic cable, e.g., one or more spans of standard single-mode optical fiber. In some embodiments, link 120 may include one or more optional optical amplifiers (not explicitly shown in FIG. 1), each connected between two corresponding fiber spans. In some embodiments, link 120 may include other optical elements, e.g., one or more optical filters, splitters, switches, etc. In some alternative embodiments, some portions or all of link 120 may be implemented using planar optical waveguides and/or free-space optical connections. In some embodiments, the distance between optical data transmitter 110 and optical data receiver 130 may be between 1 km and 100 km, e.g., including lengths that are short enough to avoid the use of in-line optical amplification, such as some typical lengths encountered in intra-datacenter optical communications.

Figure 2:
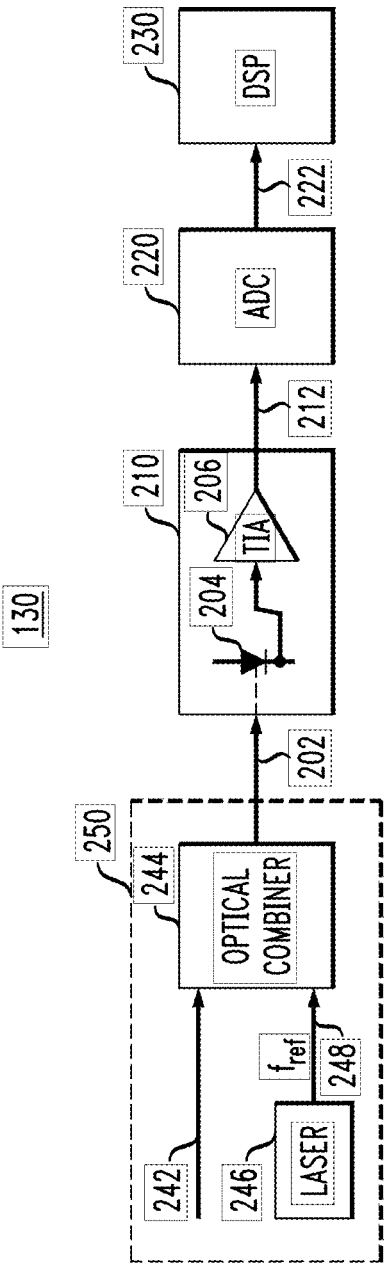
FIG. 2 shows a block diagram of a direct-detection, optical data receiver that can be used in the optical fiber communication system of FIG. 1 according to an embodiment.

FIG. 2 shows a block diagram of optical data receiver 130 according to an embodiment. Receiver 130 comprises a photodetector 210, an analog-to-digital converter (ADC) 220, and a digital signal processor (DSP) 230. Photodetector 210 is connected to receive an optical input signal 202.

In an example embodiment, photodetector 210 may comprise a single photodiode (e.g., 204) and a transimpedance amplifier (TIA; e.g., 206) connected in a single-ended electrical configuration. A corresponding amplified electrical signal 212 generated by the TIA 206 is converted into digital form by ADC 220, and a resulting digital electrical signal 222 is applied to DSP 230 for processing and data recovery therein. Example embodiments of DSP 230 are described below in reference to FIGS. 4-10.

As used herein, the term "single-ended" refers to an electrical configuration in which the photocurrent generated by a single photodiode is being sensed and/or measured by the corresponding electrical circuit (e.g., a TIA) connected to the photodiode. The single photodiode so connected has a single optical input, a single electrical output, and a p-n junction that converts light received at the optical input into electrical current at the electrical output.

A single-ended electrical configuration should be contrasted with a balanced or differential electrical configuration in which the photocurrents generated by two serially connected photodiodes are driven through a common electrical terminal, and the combined photocurrent flowing through the common electrical terminal is sensed and/or measured by the corresponding electrical circuit connected thereto. A typical balanced photodetector has two optical inputs, one electrical output, and two nominally identical constituent photodiodes having separate and distinct p-n junctions. The electrical output is between the connected photodiodes, i.e., for differential detection of the light signals received at the individual photodiodes. The quality of a balanced photodetector so constructed typically depends on the extent to which the two constituent photodiodes are matched to one another.

In some embodiments, receiver 130 may further comprise an optical circuit 250 configured to generate optical input signal 202 using a laser source 246 and an optical combiner 244. In some other embodiments, optical circuit 250 may be located at transmitter 110 (see FIG. 1). In operation, laser source 246 generates an optical frequency-reference signal 248 having an optical frequency $f_{ref}$. Optical combiner 244 operates to optically combine the optical frequency-reference signal 248 and a modulated optical signal 242 generated by an optical modulator of transmitter 110, thereby generating optical input signal 202. In different embodiments, either optical signal 242 or optical signal 202 is transmitted through link 120.

Figure 3:
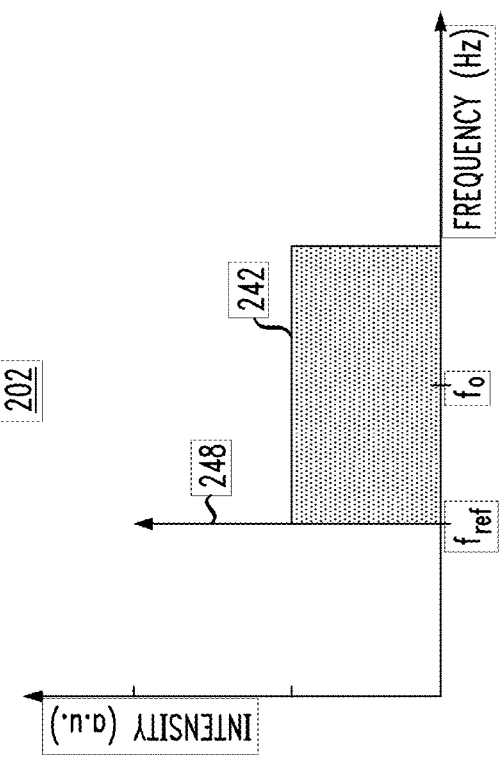
FIG. 3 graphically illustrates example spectral characteristics of an optical signal processed by the direct-detection, optical data receiver of FIG. 2 according to an embodiment.

FIG. 3 graphically illustrates example spectral characteristics of optical input signal 202 according to an embodiment. As indicated in FIG. 3, optical input signal 202 comprises (i) data-modulated optical signal 242 schematically represented by a rectangular envelope and (ii) a CW optical component 248 schematically represented by an arrow. Optical component 248 is spectrally narrow (e.g., a spectral line) and has a carrier frequency $f_{ref}$ that is approximately spectrally aligned with a roll-off edge of the data-modulated optical signal 242.

The optical carrier frequency $f_0$ of data-modulated optical signal 242 is spectrally located approximately at the center frequency of the corresponding (e.g., approximately rectangular) spectral envelope. In an example embodiment, optical signal 242 is generated at transmitter 110 by phase and/or amplitude data modulation (e.g., QAM or PAM) of the corresponding optical carrier. Unlike intensity modulation, such amplitude modulation may substantially fully deplete the optical carrier. As a result, a residual optical carrier may not be prominently present at the optical frequency $f_0$ in the spectrum of optical signal 202, e.g., as indicated in FIG. 3.

Due to the presence of both data-modulated optical signal 242 and CW optical component 248, the digital electrical signal 222 generated by ADC 220 in response to the electrical signal 212 may enable DSP 230 to evaluate the electric field (e.g., to estimate both the amplitude and phase, as sampled) of data-modulated optical signal 242. Example embodiments of digital electrical circuits that can be used in DSP 230 for this purpose are described in more detail below in reference to FIGS. 5, 6, 8, and 9. At least some of such embodiments can advantageously be used, e.g., to extend the maximum transmission distance over which optical signal 242 or 202 can be transported through optical link 120 and decoded at receiver 130 with an acceptably low bit-error rate (BER).

In some embodiments, optical signal 202 may correspond to an individual wavelength channel of a wavelength-division-multiplexed (WDM) signal.

Figure 4:
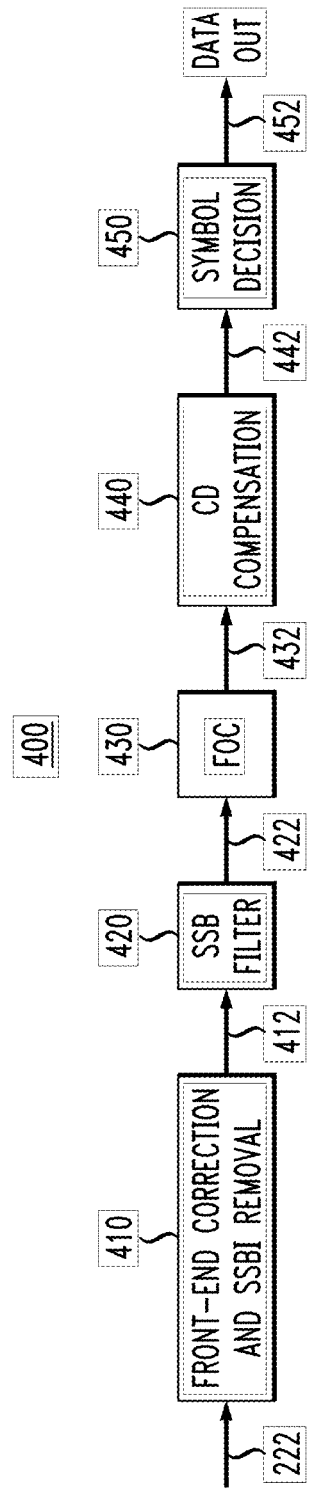
FIG. 4 shows a block diagram of a digital circuit that can be used in the direct-detection, optical data receiver of FIG. 2 according to an embodiment.

FIG. 4 shows a block diagram of a digital circuit 400 that can be used in DSP 230 (FIG. 2) according to an embodiment. A person of ordinary skill in the art will understand that DSP 230 may include additional digital circuits appropriately connected to circuit 400, e.g., as known in the pertinent art.

In an example embodiment, circuit 400 comprises digital filters 410, 420, and 440 serially connected in the chain of signal processing as indicated in FIG. 4. Circuit 400 further comprises a frequency-offset-correction (FOC) circuit 430 and a decoder 450 located upstream and downstream, respectively, from digital filter 440.

The operation of digital filters 410 and 440 can be conceptually understood by approximating the overall transfer function H of the data channel between the corresponding remote data source and DSP 230 using a product of the channel's transfer functions $H_T$ and $H_R$ as follows:

$$H = H_R \times H_T \quad (1)$$

where $H_T$ is the combined transfer function of optical data transmitter 110 and optical link 120; and $H_R$ is the transfer function of the front end of optical data receiver 130. For example, the transfer function $H_T$ may represent (i) signal distortions caused by the analog front end of the remote transmitter and (ii) one or more transport-link impairments, such as chromatic dispersion in the optical fiber, etc. The transfer function $H_R$ may represent signal distortions caused by the analog front end of receiver 130, e.g., including signal distortions caused by photodiode 204, amplifier 206, and ADC 220.

In an example embodiment, digital input signal 222 applied to circuit 400 represents the intensity I(t) of the optical input signal 202, with the distortions corresponding to the transfer function $H_R$ being already imposed thereon. Digital filter 410 operates to apply a transfer function that approximates $(H_R)^{-1}$, i.e., the inverse of the transfer function $H_R$. Digital filter 410 further operates to estimate and remove the signal-to-signal beat interference (SSBI) component of digital input signal 222. A resulting digital signal 412 generated by digital filter 410 is a real-valued signal.

In an example embodiment, digital filter 420 is a single-sideband (SSB) filter that operates to convert the real-valued digital signal 412 into a corresponding complex-valued digital signal 422. For a real-valued time-dependent signal a(t), the transfer function L of the SSB filter can be related to the Hilbert transform $\tilde{H}$ as follows:

$$L(a(t)) = \frac{1}{2}[a(t) + j\tilde{H}(a(t))] \quad (2)$$

A spectral transfer function of the SSB filter 420 is approximately the Heaviside step function having the 0-1 transition thereof at the zero frequency (which corresponds to the optical frequency $f_{ref}$, FIG. 3).

FOC circuit 430 operates on the complex-valued digital signal 422 to substantially stop the phase rotation caused by the frequency difference between the optical reference frequency $f_{ref}$ of the CW optical component 248 and the carrier frequency f) of the data-modulated optical signal 242 (also see FIG. 3). In some embodiments, FOC circuit 430 can be implemented using a multiplier configured to apply the multiplication factor $\exp(j2\pi(f_{ref}-f_0))$ to signal 422, where t is time. A resulting complex-valued digital signal 432 is then applied to digital filter 440.

Digital filter 440 operates to apply a transfer function that approximates $(H_T)^{-1}$, i.e., the inverse of the transfer function $H_T$ (see Eq. (1)). In an example embodiment, digital filter 440 can be configured to apply blind equalization to digital signal 432, thereby converting it into a corresponding digital signal 442, wherein a significant portion of the distortions corresponding to the transfer function $H_T$ has been removed. The blind-equalization algorithm used to appropriately configure digital filter 440 for this purpose can be, e.g., a constant modulus algorithm (CMA), a multiple modulus algorithm (MMA), a least mean square (LMS) algorithm, etc. An example signal impairment that can be compensated by digital filter 440 is dispersion. A person of ordinary skill in the art will understand, without undue experimentation, how to use any of the aforementioned algorithms to appropriately configure digital filter 440 for electronic dispersion compensation.

Decoder 450 operates in a conventional manner to map the complex values provided by digital signal 442 onto the operative constellation, thereby converting digital signal 442 into a corresponding binary data stream 452. In an example embodiment, the data stream 452 comprises a stream of binary labels of the constellation points onto which the complex values of digital signal 442 have been mapped in different time slots.

As already indicated above, in an example embodiment, digital signals 222 and 412 are real-valued, whereas digital signals 422, 432, and 442 are typically complex-valued.

In some embodiments, the data stream 452 can be subjected to further processing as known in the pertinent art. Such further processing may include, e.g., forward error correction (FEC), if FEC encoding is applied at transmitter 110 (also see FIG. 7B).

Figure 5:
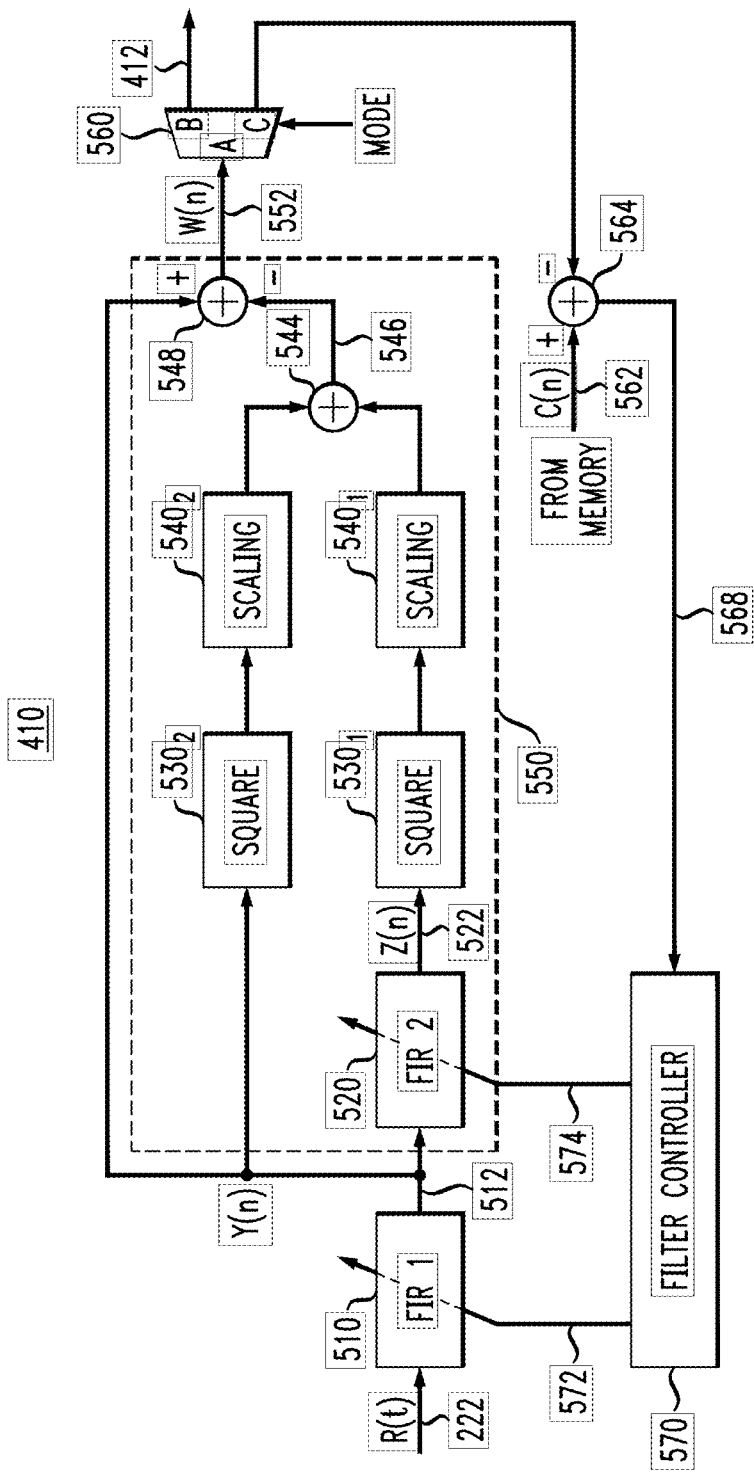
FIG. 5 shows a block diagram of a digital filter that can be used in the digital circuit of FIG. 4 according to an embodiment.

FIG. 5 shows a block diagram of digital filter 410 according to an embodiment. Digital signals 222 and 412 are also shown in FIG. 5 to better indicate the relationship between the circuits of FIGS. 4 and 5.

As shown in FIG. 5, digital filter 410 comprises a finite-impulse-response (FIR) filter 510, a digital circuit 550, a mode-selector switch 560, an adder 564, and an electronic filter controller 570 interconnected as indicated in FIG. 5. Digital circuit 550 comprises a FIR filter 520, squaring circuits $530_1$ and $530_2$, scaling circuits $540_1$ and $540_2$, and adders 544 and 548. Controller 570 operates to control, via control signals 572 and 574, the configurations of FIR filters 510 and 520, respectively, based on a feedback signal 568.

In some embodiments, FIR filter 510 may be optional and, as such, may be omitted or bypassed.

Mode-selector switch 560 is used to configure digital filter 410 for operation in two different modes: a calibration mode and a work mode. In the calibration mode, switch 560 connects an input port A thereof to an output port C thereof, thereby closing the feedback loop through which feedback signal 568 can be applied to controller 570. More specifically, the output port C is connected to adder 564, which also receives a calibration signal 562, e.g., from a memory. In some embodiments, calibration signal 562 may be computed on the fly using a selected bit or symbol sequence read from the memory. Adder 564 generates feedback signal 568 for controller 570 by computing a difference between the signal received from port C of switch 560 and the calibration signal 562. In an example embodiment calibration signal 562 can be based on any suitable bit or symbol sequence known to both transmitter 110 and receiver 130 so that the feedback signal 568 represents a sequence of errors with respect to this known bit or symbol sequence.

In the work mode, switch 560 connects the input port A to an output port B thereof, thereby causing a digital output signal 552 generated by circuit 550 to be read out as digital signal 412. In this particular configuration, the feedback loop is in the open state, which causes controller 570 to keep the FIR-filter coefficients constant, e.g., using the values thereof determined during a recent instance of the calibration mode.

Digital signal 222 received by digital filter 410 represents the intensity $I(t)=|E(t)|^2$ of optical signal 202, where t is time; and E(t) is the effective electric field of optical signal 202. As such, digital signal 222 can be approximated using Eq. (3):

$$R(t)=|r(t)|^2=|A|^2+A^* \cdot s(t) \cdot e^{j2\pi Ft}+A \cdot s^*(t) \cdot e^{j2\pi Ft}+|s(t)|^2 \quad (3)$$

where $$r(t)=A+s(t) \cdot e^{j2\pi Ft} \quad (4)$$

where A is the amplitude of the CW optical component 248; s(t) is the baseband data-bearing signal corresponding to optical signal 242; $F=f_0-f_{ref}$) is the frequency offset between optical frequency-reference signal 248 and the optical carrier frequency $f_0$ of data-modulated optical signal 242; and the "*" symbol in the superscript denotes complex conjugation. During the work mode, the information-bearing signal s(t) is typically unknown, and the chain of digital signal processing of receiver 130 operates to recover the information-bearing signal s(t) by appropriately processing digital signal 222. In contrast, during the calibration mode, the information-bearing signal s(t) is typically known (e.g., $s(t)=s_0(t)$) and can be used to tune FIR filters 510 and 520, e.g., as described below.

The filter coefficients used in FIR filters 510 and 520 can be represented by vectors $H_1$ and $H_2$, respectively, where:

$$H_1=\{H_1(i), i=1,2,\ldots,L_1\} \quad (5a)$$

$$H_2=\{H_2(i), i=1,2,\ldots,L_2\} \quad (5b)$$

where $L_1$ and $L_2$ are integers greater than one; $L_1$ is the length of (e.g., the number of taps in) FIR filter 510; and $L_2$ is the length of (e.g., the number of taps in) FIR filter 520. A digital output signal 512 generated by FIR filter 510 can then be represented by the sequence Y(n) expressed as follows:

$$Y(n) = \sum_{i=1}^{L_1} H_1(i) X(n-i) \quad (6)$$

where n is the time-slot index; and $$X(n)=R(n)-\langle R(n)\rangle \quad (7)$$

where $\langle R(n)\rangle$ denotes the running average of R(n) taken over a suitable number N of time slots. The subtraction of Eq. (7) may be performed prior to processing by FIR filter 510 and is typically a subtraction that removes the direct-current (dc) component of the measured signal of Eq. (3). A digital output signal 522 generated by FIR filter 520 can then be represented by the sequence Z(n) expressed as follows:

$$Z(n) = \sum_{j=1}^{L_2} H_2(j) Y(n-j) \quad (8)$$

Circuits 530₁, 530₂, 540₁, and 540₂ and adders 544 and 548 operate to generate digital output signal 552 in response to digital signals 512 and 522. Digital output signal 552 can be represented by the sequence W(n) expressed as follows:

$$W(n)=Y(n)-\alpha(Y(n)^2+Z(n)^2) \quad (9)$$

where the squared signal values are generated by circuits 530₁ and 530₂; and α is the scaling coefficient applied by each one of circuits 540₁ and 540₂ and given by Eq. (10):

$$\alpha = \frac{1}{4\langle R(n)\rangle} \quad (10)$$

In the calibration mode, digital output signal 552 is applied to a first (e.g., negative) input of adder 564. A second (e.g., positive) input of adder 564 receives calibration signal 562, which can be represented by the sequence C(n) obtained by properly sampling the following waveform c(t):

$$c(t)=\mathrm{Re}(s_0(t)) \cdot \cos(2\pi Ft)-\mathrm{Im}(s_0(t)) \cdot \sin(2\pi Ft) \quad (11)$$

where $s_0(t)$ is the known baseband information-bearing signal carried by optical signal 242 during the calibration mode. The corresponding digital signal 222 can be approximated, e.g., using Eq. (3), wherein $s(t)=s_0(t)$. Adder 564 operates to generate error-feedback signal 568, which can be represented by the error sequence e(n) expressed as follows:

$$e(n)=C(n)-W(n) \quad (12)$$

Eq. (12) defines a cost function that, if minimized, causes digital filter 410 to: (i) substantially cancel the signal distortions imposed by the front end of receiver 130; and (ii) accurately estimate and remove the SSBI component of digital input signal 222.

Controller 570 is configured to use feedback signal 568 as an error signal for an LMS algorithm or a functionally similar algorithm employed therein to determine the filter coefficients for each of FIR filters 510 and 520. In an example embodiment, controller 570 may be programmed to update the filter coefficients in accordance with the following recursive formulas:

$$H_1^{n+1}(i) = H_1^n(i) + \mu_1 \cdot e(n) \cdot \\ \left[ X(n-i) - 2\alpha \cdot Y(n) \cdot X(n-i) - 2\alpha \cdot Z(n) \sum_{j=1}^{L_2} H_2^n(j) X(n-i-j) \right] \quad (13)$$

$$H_2^{n+1}(j) = H_2^n(j) - \mu_2 \cdot e(n) \cdot 2\alpha \cdot Z(n) Y(n-j) \quad (14)$$

where $i=1, 2, \ldots, L_1$; $j=1, 2, \ldots, L_2$; and $\mu_1$ and $\mu_2$ are positive convergence coefficients of the LMS algorithm.

LMS algorithms are typically used in adaptive signal filtering to approximate a desired filter behavior by finding the filter coefficients (weights) that relate to the least mean square of the error signal (e.g., the difference between the desired and actual signals). An LMS algorithm typically relies on a stochastic gradient-descent method in that the filter weights are only adapted based on the error at the current time. In an example implementation, an LMS algorithm may start by assuming some initial filter weights and then, at each step, find the gradient of the mean square error (MSE). The filter weights are then updated (increased or decreased) based on the sign and magnitude of the MSE gradient. The LMS algorithm thus tends to drive the system towards the MSE minimum. The step size with which the filter weights are updated is controlled by a particular LMS-algorithm parameter, which is typically referred-to in the relevant literature as the convergence coefficient $\mu$. In Eqs. (13)-(14), such convergence coefficients are denoted $\mu_1$ and $\mu_2$, respectively.

Note that the processing implemented in digital filter 410 operates on and generates real-valued signals. The filter coefficients used in FIR filters 510 and 520 are also real-valued. These characteristics of digital filter 410 may be beneficial, e.g., in terms of enabling the corresponding relatively low circuit complexity and/or relatively fast processing speed.

Conceptually, the operation of digital filter 410 may be understood as follows.

The transfer function of FIR filter 510 approximates the inverse transfer function of the front end of receiver 130, which includes photodiode 204, TIA 206, and ADC 220.

The transfer function of FIR filter 520 approximates the Hilbert transform. Thus, a digital signal 546 generated in digital circuit 550 can be expressed as follows:

$$B(t) = \alpha[|R(t)|^2 + |\tilde{H}(R(t))|^2] \quad (15)$$

where B(t) denotes digital signal 546; $\alpha$ is given by Eq. (10); and R(t) is given by Eq. (3). It can be verified that B(t) computed in accordance with Eq. (15) provides an estimate of the SSBI component of digital signal 222, i.e.:

$$B(t) \approx |s(t)|^2 \quad (16)$$

where s(t) is defined in reference to Eqs. (3)-(4). Thus, adder 548 in effect operates to perform approximate SSBI cancellation.

For an example embodiment, the validity of Eq. (16) can be confirmed, e.g., as follows. By applying the SSB transfer function L (see Eq. (2)) to Eq. (3), one obtains the following equation:

$$L(R(t)) = A^* \cdot s(t) \cdot e^{j2\pi Ft} + L(|s(t)|^2) \quad (17)$$

When A >> |s(t)|, Eq. (17) can be reduced to Eq. (18):

$$L(R(t)) \approx A^* \cdot s(t) \cdot e^{j2\pi Ft} \quad (18)$$

From Eq. (18), the SSBI component $|s(t)|^2$ can be estimated as:

$$|s(t)|^2 \approx \frac{|L(R(t))|^2}{|A|^2} \quad (19)$$

Using the definition of the SSB transfer function L provided by Eq. (2) and by noting that R(t) is real-valued, Eq. (19) can be rewritten as follows:

$$|s(t)|^2 \approx \frac{|R(t)|^2 + |H - (R(t))|^2}{4|A|^2} \quad (20)$$

By further noting that, when A >> |s(t)|, Eq. (10) can be approximated as $$\alpha = \frac{1}{4\langle R(n)\rangle} \approx \frac{1}{4|A|^2},$$

one finds that Eqs. (15) and (20) match, which verifies Eq. (16).

Figure 6A:
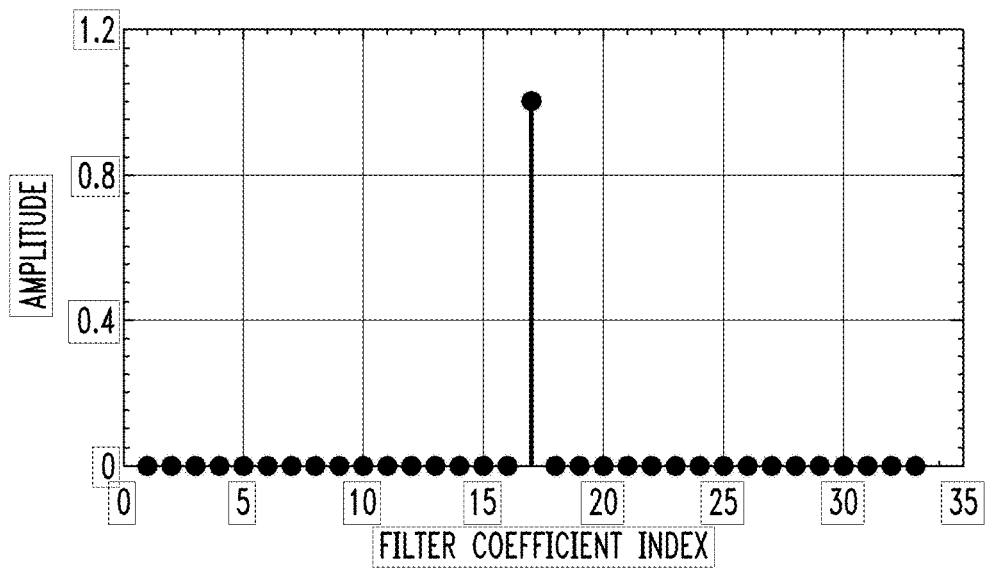
FIGS. 6A and 6B graphically show initial values of the filter-coefficient vectors that can be used in the digital filter of FIG. 5 according to an embodiment.
Figure 6B:
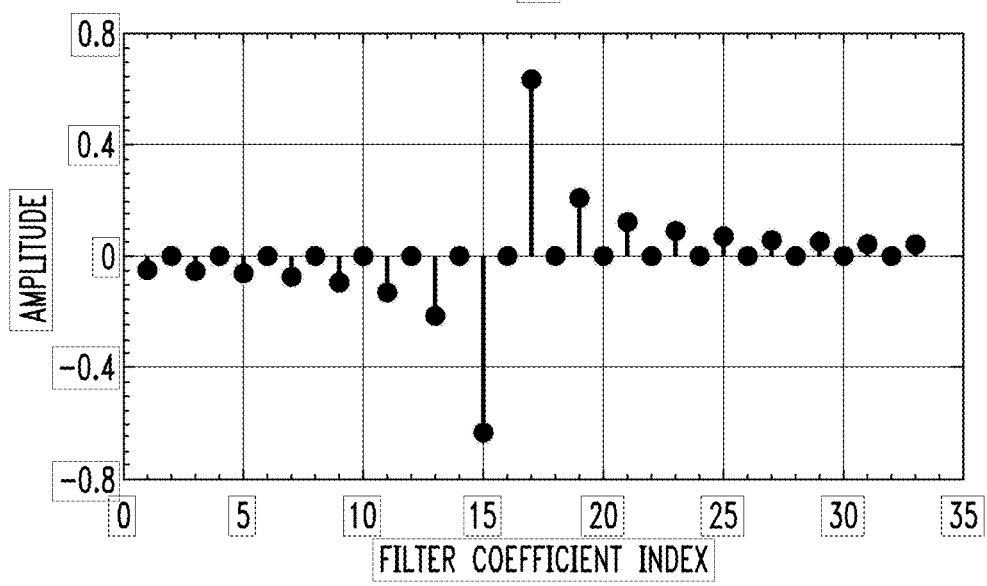

FIGS. 6A and 6B graphically show example initial values of the filter-coefficient vectors $H_1$ and $H_2$ (Eqs. (5a)-(5b)) that can be used in FIR filters 510 and 520, respectively, according to an embodiment. Under the notation used in Eqs. (13)-(14), the shown vectors $H_1$ and $H_2$ correspond to the time-slot index n=0. In this particular embodiment, the filter lengths are $L_1 = L_2 = 33$. The shown initial values can beneficially be used, e.g., to ensure fast convergence of the LMS algorithm used in controller 570.

FIG. 6A graphically shows example initial coefficient values for the vector $H_1$ used to configure FIR filter 510. In this particular example, all coefficients are zeros, except for the coefficient $H_1^0(17)$. This particular pattern approximates the temporal delta function, which represents an expected ideal behavior of FIR filter 510.

FIG. 6B graphically shows example initial coefficient values for the vector $H_2$ used to configure FIR filter 520. In this particular example, even-indexed filter coefficients are all zeros. The odd-indexed filter coefficients are antisymmetric with respect to the filter coefficient index i=16, with the coefficient values being approximately inversely proportional to the absolute value of the corresponding index difference, |i−16|. This particular pattern approximates the Hilbert transform, which represents an expected ideal behavior of FIR filter 520.

FIGS. 7A-7C pictorially show a frame structure that can be used in system 100 (FIG. 1) according to an embodiment. The shown frame structure complies with the ITU-T G.709/Y.1331 Recommendation, which is incorporated herein by reference in its entirety. A person of ordinary skill in the art will understand that other suitable frame structures may similarly be used in alternative embodiments of system 100.

FIG. 7A pictorially shows an optical data unit ODUk of an optical data frame that can be transmitted in system 100 (FIG. 1) according to an example embodiment. The data of optical data unit ODUk are organized in 3824 columns and four rows, with each position containing one byte of data.

FIG. 7B pictorially shows an optical transport unit OTUk of an optical data frame that may include the optical data unit ODUk of FIG. 7A. The frame structure of optical transport unit OTUk is based on the frame structure of optical data unit ODUk which is extended to contain 256 additional columns for an OTUk FEC data block 702. An OTU overhead OTU OH is located in row 1, columns 1 to 14, of optical data unit ODUk. The overhead bytes in row 1, columns 1 to 7, of OTU overhead OTU OH are used for the frame-alignment overhead, which is labeled in FIG. 7B as FA OH. The overhead bytes in row 1, columns 8 to 14, of OTU overhead OTU OH are used for the OTUk-specific overhead, which is labeled in FIG. 7B as OTUk OH. A remaining portion 701 of optical data unit ODUk may be used to carry payload data.

FIG. 7C pictorially shows a more-detailed (expanded) view of the OTU overhead OTU OH. Columns 1 to 6 of OTU OH are configured to carry a frame alignment signal FAS. Column 7 of OTU OH is configured to carry a multi-frame alignment signal MFAS. Columns 8 to 10 of OTU OH are configured to carry an overhead corresponding to the general communication channel GCC0. Columns 13 and 14 of OTU OH are configured to carry an overhead RES, which is reserved for proprietary use and future standardization. A more-detailed description of the various bytes of the OTU overhead OTU OH shown in FIG. 7C can be found, e.g., in the above-cited ITU-T G.709/Y.1331 Recommendation.

In an example embodiment, at least some of frame alignment signal FAS, multi-frame alignment signal MFAS, and overhead RES may carry data signals that are known a priori to receiver 130. As such, at least some of these data signals may be used to provide the signal $s_0(t)$ and the corresponding calibration signal 562 for the calibration mode of operation of some embodiments of receiver 130. The capability to use these signals for calibration purposes is advantageously enabled, e.g., by a relatively fast convergence speed of the above-described filter-coefficient-update process implemented in digital filter 410 of FIG. 5. As a result, digital filter 410 can advantageously be tuned to track the communication channel without interrupting the transmission of payload data typically carried by at least a portion of the optical data unit ODUk (FIG. 7A).

FIG. 8 shows a flow chart of a signal-processing method 800 that can be used in digital filter 410 (FIG. 5) according to an embodiment.

Step 802 of method 800 is used to switch digital filter 410 between two different modes of operation. In the calibration mode, step 802 directs the processing of method 800 to steps 804-814, in which the filter coefficients for FIR filters 510 and 520 are determined. In the payload mode, step 802 directs the processing of method 800 to step 816, wherein the filter coefficients determined during a prior instance of the calibration mode are used to configure digital filter 410 for processing the payload signal.

At step 804, controller 570 reads from the memory the initial values of the filter-coefficient vectors $H_1$ and $H_2$ and uses control signals 572 and 574 to load these initial values into FIR filters 510 and 520, respectively.

At step 806, digital filter 410 receives digital input signal 222 corresponding to an optical calibration signal. As already, indicated above, such an optical calibration signal carries the information signal $s_0(t)$. In some embodiments, the optical calibration signal may be applied to receiver 130 using a suitable preamble or overhead portion of a received optical data frame, e.g., as explained in reference to FIG. 7C. In some other embodiments, the optical calibration signal may be an optical signal generated and transmitted by transmitter 110 specifically for the purpose of computing FIR-filter coefficients at receiver 130. A person of ordinary skill in the pertinent art will understand that alternative implementations of the calibration mode in system 100 and/or calibration signals used therein are also possible.

Digital filter 410 also computes or reads from a memory, e.g., local to the optical receiver 130, the calibration signal 562. As already indicated above, calibration signal 562 is based on the a priori knowledge of the signal $s_0(t)$ carried by the received optical calibration signal.

At step 808, digital filter 410 processes the digital input signal 222 received at step 806 to generate the feedback signal 568 for controller 570. In an example embodiment, the processing of step 808 may be implemented in accordance with Eqs. (6)-(12).

At step 810, controller 570 uses the feedback signal 568 generated at step 808 to update the filter-coefficient vectors $H_1$ and $H_2$ used in FIR filters 510 and 520, respectively. In an example embodiment, this update may be implemented in accordance with Eqs. (13)-(14).

At step 812, controller 570 determines whether or not the LMS algorithm has converged onto an acceptable solution for the filter-coefficient vectors $H_1$ and $H_2$ using any suitable convergence criterion. If the convergence criterion is satisfied, then the processing of method 800 is directed to step 814. Otherwise, the processing of method 800 is directed back to step 806 for further update(s) of the filter-coefficient vectors $H_1$ and $H_2$.

At step 814, controller 570 stores in the memory the updated filter-coefficient vectors $H_1$ and $H_2$, and the processing of method 800 is directed back to step 802.

At step 816, controller 570 reads the filter-coefficient vectors $H_1$ and $H_2$ from the memory and generates the corresponding control signals 572 and 574 that configure FIR filters 510 and 520 to use those filter coefficients in the payload mode of operation.

Figure 9:
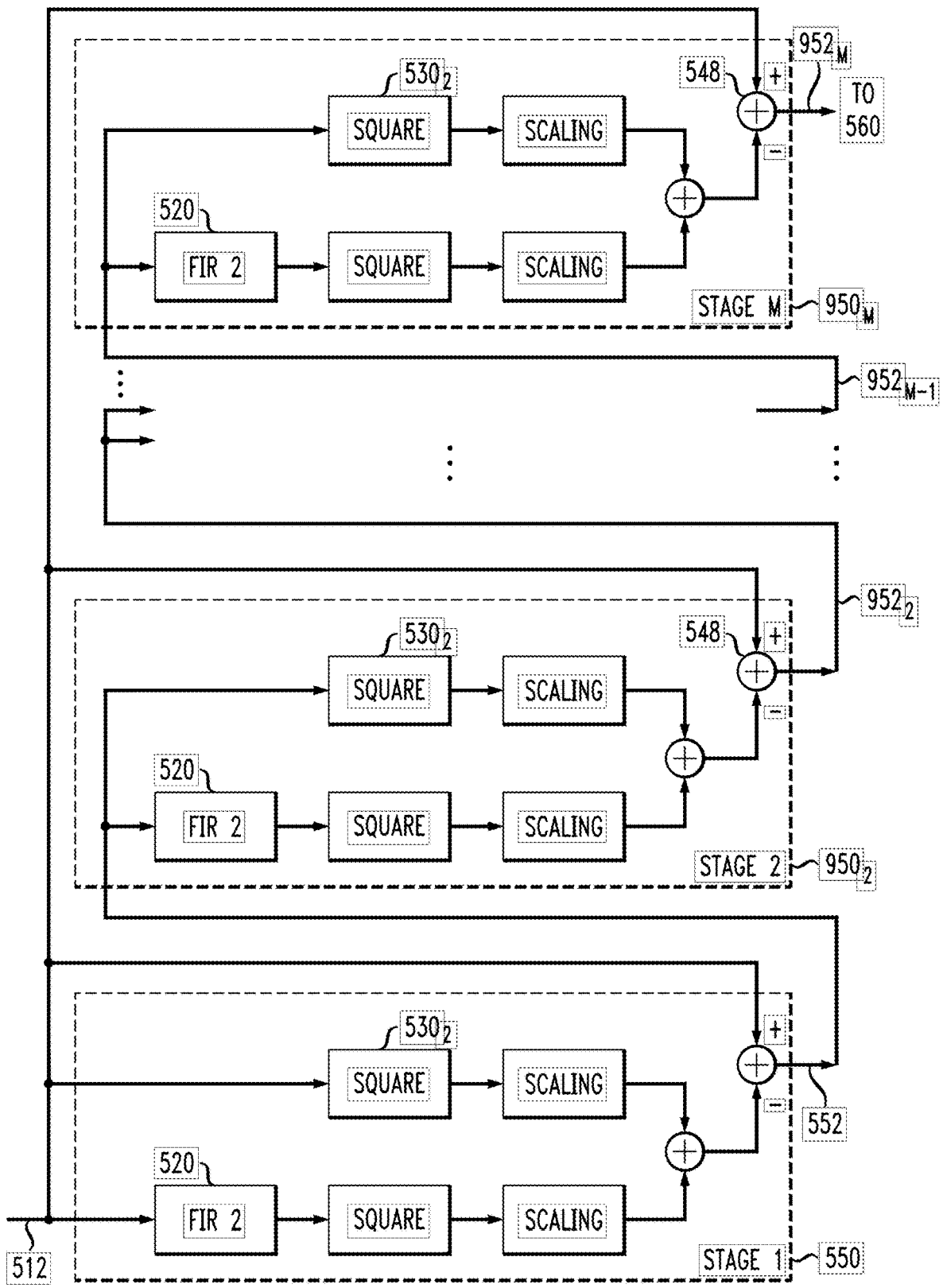
FIG. 9 shows a block diagram of a multistage SSBI-cancellation circuit that can be used in the digital filter of FIG. 5 according to an alternative embodiment.

FIG. 9 shows a block diagram of a multistage SSBI-cancellation circuit 900 that can be used in digital filter 410 according to an embodiment. More specifically, circuit 900 can be used to replace circuit 550 in the embodiment of digital filter 410 shown in FIG. 5. The input signal to circuit 900 is digital signal 512, e.g., from FIR filter 510 (see FIG. 5). The output signal generated by circuit 900 is a digital signal $952_M$, which is applied to port A of selector switch 560 (FIG. 5).

Circuit 900 comprises M serially connected SSBI-cancellation stages, where M is an integer greater than one. The first SSBI-cancellation stage in circuit 900 is digital circuit 550 of FIG. 5. Additional SSBI-cancellation stages in circuit 900 are digital circuits $950_2$-$950_M$. In an example embodiment, each of digital circuits $950_2$-$950_M$ can be a nominal copy of digital circuit 550 having the external connections that are slightly different from those of digital circuit 550. More specifically, the FIR filter 520 and squaring circuit $530_2$ of digital circuit $950_2$ are connected to receive respective copies of digital output signal 552 generated by digital circuit 550. The FIR filter 520 and squaring circuit $530_2$ of digital circuit $950_m$ (where m=3, M) are connected to receive respective copies of a digital output signal $952_{m-1}$ generated by digital circuit $950_{m-1}$. Adders 548 of digital circuits $950_2$-$950_M$ are connected to receive respective copies of digital signal 512. As already indicated above, the digital output signal $952_M$ generated by digital circuit $950_M$ is applied to selector switch 560 (FIG. 5).

In operation, each subsequent SSBI-cancellation stage uses the output of the preceding SSBI-cancellation stage to improve the accuracy of SSBI estimation and cancellation therein. For some practical applications, an optimal number M of SSBI-cancellation stages in circuit 900 may range from M=2 to M=4.

FIG. 10 graphically shows estimated example improvements that may be achieved according to some embodiments. The simulation results presented in FIG. 10 correspond to an embodiment in which the carrier-to-signal power ratio $$\frac{|A|^2}{\langle |s(t)|^2 \rangle}$$

is 10 dB. Modulated optical signal 242 is a 64-Gbaud 16-QAM signal. The combined response of photodetector 210 and ADC 220 is modeled as a $4^{th}$ order Butterworth low-pass filter with a 3-dB bandwidth of 35 GHz.

A curve 1002 represents a performance estimate of a comparable conventional KK scheme, e.g., implemented as described in the above-cited Mecozzi paper. In this case, the output signal-to-noise ratio (SNR) levels off at approximately 11.5 dB.

A curve 1004 represents a performance estimate for receiver 130 employing an embodiment of digital filter 410 of FIG. 5. This particular embodiment can advantageously provide an estimated performance improvement between approximately 1.5 dB and 5 dB compared to the KK scheme.

Curves 1006 and 1008 represent performance estimates for the optical receiver 130 employing embodiments of digital filter 410 having circuit 900 (FIG. 5) with the number M of SSBI-cancellation stages M=2 and M=3, respectively. These particular embodiments can advantageously provide estimated performance improvements between approximately 2 dB and 10 dB compared to the KK scheme.

In various use cases, example embodiments may be used to obtain one or more of the following benefits and/or advantages:
- (A) accurate and reliable SSBI cancellation and correction of the receiver front-end distortions;
- (B) fast convergence of the corresponding LMS algorithm (s) and low latency of the SSBI cancellation;
- (C) capability to use arbitrary known symbol sequences for filter tuning and calibration. This particular feature enables the use of optical-frame preambles and/or overheads, e.g., frame alignment signals therein, for filter tuning and calibration, which advantageously supports high flexibility in implementation; and
- (D) possible development of a universal, high-performance ASIC-implemented DSP that can be used in a variety of SSB direct-detection optical receivers without a need for dedicated and/or customized filter-calibration procedures. This particular feature may be used to significantly reduce the time investment and/or expenditures for the effort of developing high-capacity SSB direct-detection optical communication systems.

According to an example embodiment disclosed above, e.g., in the summary section and/or in reference to any one or any combination of some or all of FIGS. 1-10, provided is an apparatus comprising: a direct-detection optical data receiver (e.g., 130, FIGS. 1, 2) that comprises: a photodiode detector (e.g., 210, FIG. 2); and a digital signal processor (e.g., 230, FIG. 2) connected to receive digital measurements (e.g., 222, FIGS. 2, 4, 5) of light by the photodiode detector at a sequence of times, the digital signal processor being configured to recover a data stream (e.g., 452, FIG. 4) of an optical input signal (e.g., 242, FIGS. 2, 3) from the digital measurements, each of the measurements measuring a combination of the optical input signal and an optical frequency reference (e.g., 248, FIGS. 2, 3) at one of the times; and wherein the digital signal processor comprises a first finite-impulse-response (FIR) filter (e.g., 510, FIG. 5) and a first digital circuit (e.g., 550, FIG. 5) that comprises a second FIR filter (e.g., 520, FIG. 5) serially connected with the first FIR filter, the first FIR filter being configured to generate a first filtered digital signal (e.g., 512, FIG. 5) in response to the digital measurements, the first digital circuit being configured to compute a first estimate (e.g., 546, FIG. 5) of signal-to-signal beat interference (SSBI) in the digital measurements in response to the first filtered digital signal and being further configured to subtract the first estimate from the first filtered digital signal.

According to another example embodiment disclosed above, e.g., in the summary section and/or in reference to any one or any combination of some or all of FIGS. 1-10, provided is an apparatus comprising a direct-detection optical data receiver (e.g., 130, FIGS. 1, 2) that comprises: a single-ended photodiode (e.g., 210, FIG. 2) to receive light combining an optical data signal (e.g., 242, FIGS. 2, 3) and an optical frequency reference (e.g., 248, FIGS. 2, 3); an analog-to-digital converter (e.g., 220, FIG. 2) to output a sequence of digital intensity measurements (e.g., 222, FIGS. 2, 4, 5) of the light received by the single-ended photodiode at a sequence of corresponding times; and a digital signal processor (e.g., 230, FIG. 2) connected to receive the digital intensity measurements, the digital signal processor being configured to recover a data stream (e.g., 452, FIG. 4) carried by the optical data signal from the digital intensity measurements; wherein the digital signal processor comprises a first finite-impulse-response (FIR) filter (e.g., 510, FIG. 5) and a digital circuit (e.g., 550, FIG. 5) that comprises a second FIR filter (e.g., 520, FIG. 5), the second FIR filter being serially connected with the first FIR filter, the first FIR filter being configured to filter the digital intensity measurements, the digital circuit being configured to subtract estimates (e.g., 546, FIG. 5) of signal-to-signal beat interference (SSBI) from the digital intensity measurements filtered by the first FIR filter (e.g., 512, FIG. 5); and wherein the digital signal processor is configured to update filter coefficients of both the first and second FIR filters based on a same feedback signal (e.g., 568, FIG. 5).

In some embodiments of the above apparatus, a digital value carried by the feedback signal is representative of a residual error after subtraction of one of the estimates of the SSBI from a corresponding one of the filtered digital intensity measurements.

In some embodiments of any of the above apparatus, the digital signal processor is configured to recover the data stream based on a stream of digital values (e.g., 552, FIG. 5) generated by the digital circuit by subtracting the estimates from the first filtered digital intensity measurements.

In some embodiments of any of the above apparatus, the digital signal processor further comprises an electronic controller (e.g., 570, FIG. 5) configured to update the filter coefficients of both the first FIR filter and the second FIR filter based on said feedback signal (e.g., 568, FIG. 5), which is generated using the stream of digital values.

In some embodiments of any of the above apparatus, the filter coefficients are real-valued.

In some embodiments of any of the above apparatus, the digital signal processor is configured to generate said feedback signal by also using a predetermined calibration sequence (e.g., C(n), FIG. 5).

In some embodiments of any of the above apparatus, the predetermined calibration sequence is retrieved from a memory of the direct-detection optical data receiver.

In some embodiments of any of the above apparatus, the digital signal processor is configured to update filter coefficients of the first and second FIR filters using an overhead portion (e.g., OTU OH, FIG. 7C) of a received optical frame (e.g., OTUk, FIG. 7B) and is further configured to use the filter coefficients so updated to recover the data stream from the digital intensity measurements of a payload portion (e.g., 701, FIG. 7B) of the received optical frame.

In some embodiments of any of the above apparatus, the direct-detection optical data receiver is configured to use the overhead portion for signal synchronization.

In some embodiments of any of the above apparatus, the second FIR filter is configured to generate further-filtered digital intensity measurements (e.g., 522, FIG. 5) by filtering the filtered digital intensity measurements produced by the first FIR filter; and wherein the digital circuit is configured to compute the estimates by summing (e.g., using 544, FIG.

5) scaled squares of the filtered digital intensity measurements and the further-filtered digital intensity measurements.

In some embodiments of any of the above apparatus, the digital signal processor further comprises another digital circuit (e.g., 950₂, FIG. 9) serially connected with the digital circuit and configured to compute second estimates of the SSBI from a stream of digital values (e.g., 552, FIG. 9) generated by the digital circuit.

In some embodiments of any of the above apparatus, said another digital circuit is configured to subtract the second estimates from the filtered digital signal.

In some embodiments of any of the above apparatus, the second digital circuit comprises a third FIR filter (e.g., 520 of 950₂, FIG. 9) connected to receive the stream of digital values.

In some embodiments of any of the above apparatus, the digital signal processor further comprises a digital filter (e.g., 440, FIG. 4) serially connected to the first digital circuit and configured to perform some dispersion compensation.

In some embodiments of any of the above apparatus, the optical frequency reference is spectrally adjacent a roll-off edge of the optical data signal (e.g., as indicated in FIG. 3).

In some embodiments of any of the above apparatus, the digital signal processor further comprises a correction circuit (e.g., 430, FIG. 4) configured to compensate for a frequency difference (e.g., ($f_0$–$f_{ref}$), FIG. 3) between the optical frequency reference and a frequency of the optical data signal.

In some embodiments of any of the above apparatus, the apparatus further comprises: a laser (e.g., 246, FIG. 2) configured to generate the optical frequency reference; and an optical combiner (e.g., 244, FIG. 2) configured to combine the optical data signal and the optical frequency reference.

In some embodiments of any of the above apparatus, the digital signal processor is configured to estimate an amplitude and a phase corresponding to some of the data carried by the optical data signal based on a stream of digital values (e.g., 552, FIG. 5) from the digital circuit.

According to yet another example embodiment disclosed above, e.g., in the summary section and/or in reference to any one or any combination of some or all of FIGS. 1-10, provided is an apparatus comprising: a direct-detection optical data receiver (e.g., 130, FIGS. 1, 2) that comprises: a photodiode detector (e.g., 210, FIG. 2); and a digital signal processor (e.g., 230, FIG. 2) connected to receive digital measurements (e.g., 222, FIGS. 2, 4, 5) of light by the photodiode detector at a sequence of times, the digital signal processor being configured to recover a data stream (e.g., 452, FIG. 4) of an optical input signal (e.g., 242, FIGS. 2, 3) from the digital measurements, each of the measurements measuring a combination of the optical input signal and an optical frequency reference (e.g., 248, FIGS. 2, 3) at one of the times; and wherein the digital signal processor comprises a digital circuit (e.g., 550, FIG. 5) that comprises a finite-impulse-response (FIR) filter (e.g., 520, FIG. 5) configured to generate a filtered digital signal (e.g., 522, FIG. 5) in response to a digital input signal (e.g., 512, FIG. 5) applied thereto, the digital input signal being applied to the FIR filter in response to the digital measurements, the digital circuit being configured to compute an estimate (e.g., 546, FIG. 5) of signal-to-signal beat interference (SSBI) in the digital measurements by summing (e.g., using 544, FIG. 5) a scaled square of the filtered digital signal and a scaled square of the digital input signal.

In some embodiments of the above apparatus, the digital circuit is configured to subtract the estimate from the digital input signal.

In some embodiments of any of the above apparatus, the digital signal processor is configured to recover the data stream based on a digital output signal (e.g., 552, FIG. 5) generated by the digital circuit by subtracting the estimate from the digital input signal.

In some embodiments of any of the above apparatus, the digital input signal comprises the digital measurements.

In some embodiments of any of the above apparatus, the digital signal processor is configured to update filter coefficients of the FIR filter using the digital measurements of an overhead portion (e.g., OTU OH, FIG. 7C) of a received optical frame (e.g., OTUk, FIG. 7B) and is further configured to use the filter coefficients so updated to recover the data stream from the digital measurements of a payload portion (e.g., 701, FIG. 7B) of the received optical frame.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a direct-detection optical data receiver that comprises:
    a single-ended photodiode to receive light combining an optical data signal and an optical frequency reference;
    an analog-to-digital converter to output digital intensity measurements of the light received by the single-ended photodiode at a sequence of times; and
    a digital signal processor connected to receive the digital intensity measurements, the digital signal processor being configured to recover a data stream carried by the optical data signal from the digital intensity measurements;
    wherein the digital signal processor comprises a first finite-impulse-response (FIR) filter and a digital circuit that comprises a second FIR filter, the second FIR filter being serially connected with the first FIR filter, the first FIR filter being configured to filter the digital intensity measurements, the digital circuit being configured to subtract estimates of signal-to-signal beat interference (SSBI) from the filtered digital intensity measurements generated by the first FIR filter; and
    wherein the digital signal processor is configured to update filter coefficients of both the first and second FIR filters based on a same feedback signal.

2. The apparatus of claim 1, wherein a digital value carried by the feedback signal is representative of a residual error after subtraction of one of the estimates of the SSBI from a corresponding one of the filtered digital intensity measurements.

3. The apparatus of claim 1, wherein the digital signal processor is configured to recover the data stream based on a stream of digital values generated by the digital circuit by subtracting the estimates from the first filtered digital intensity measurements.

4. The apparatus of claim 3, wherein the digital signal processor further comprises an electronic controller configured to update the filter coefficients of both the first FIR filter and the second FIR filter based on the feedback signal, which is generated using the stream of digital values.

5. The apparatus of claim 4, wherein the digital signal processor is configured to generate the feedback signal by also using a predetermined calibration sequence.

6. The apparatus of claim 1, wherein the digital signal processor is configured to update the filter coefficients of the first and second FIR filters using an overhead portion of a received optical frame and is further configured to use the updated filter coefficients to recover the data stream from the digital intensity measurements of a payload portion of the received optical frame.

7. The apparatus of claim 6, wherein the direct-detection optical data receiver is configured to use the overhead portion for signal synchronization.

8. The apparatus of claim 1,
wherein the second FIR filter is configured to generate further-filtered digital intensity measurements by filtering the filtered digital intensity measurements produced by the first FIR filter; and
wherein the digital circuit is configured to compute the estimates by summing scaled squares of the filtered digital intensity measurements and the further-filtered digital intensity measurements.

9. The apparatus of claim 1, wherein the digital signal processor further comprises another digital circuit serially connected with the digital circuit and configured to compute second estimates of the SSBI from a stream of digital values generated by the digital circuit.

10. The apparatus of claim 9, wherein the another digital circuit is configured to subtract the second estimates from the filtered digital signal.

11. The apparatus of claim 9, wherein the another digital circuit comprises a third FIR filter connected to receive the stream of digital values.

12. The apparatus of claim 1, wherein the digital signal processor further comprises a digital filter serially connected to the first digital circuit and configured to perform dispersion compensation.

13. The apparatus of claim 1, wherein the optical frequency reference is spectrally adjacent a roll-off edge of the optical data signal.

14. The apparatus of claim 1, wherein the digital signal processor further comprises a correction circuit configured to compensate for a frequency difference between the optical frequency reference and a frequency of the optical data signal.

15. The apparatus of claim 1, further comprising:
a laser configured to generate the optical frequency reference; and
an optical combiner configured to combine the optical data signal and the optical frequency reference.

16. The apparatus of claim 1, wherein the digital signal processor is configured to estimate an amplitude and a phase of a modulation symbol carried by the optical data signal based on a stream of digital values from the digital circuit.

17. An apparatus comprising a direct-detection optical data receiver that comprises:
a photodiode detector; and
a digital signal processor connected to receive digital measurements of light generated by the photodiode detector at a sequence of times, the digital signal processor being configured to recover a data stream of an optical input signal from the digital measurements, each of the digital measurements measuring a combination of the optical input signal and an optical frequency reference at one of the times of the sequence; and
wherein the digital signal processor comprises a digital circuit that comprises a finite-impulse-response (FIR) filter configured to generate a filtered digital signal in response to a digital input signal applied thereto, the digital input signal being generated from the digital measurements, the digital circuit being configured to compute an estimate of signal-to-signal beat interference (SSBI) in the digital measurements by summing a scaled square of the filtered digital signal and a scaled square of the digital input signal.

18. The apparatus of claim 17,
wherein the digital circuit is configured to subtract the estimate from the digital input signal; and
wherein the digital signal processor is configured to recover the data stream based on a digital output signal generated by the digital circuit by subtracting the estimate from the digital input signal.

19. The apparatus of claim 17, wherein the digital input signal is generated by processing the digital measurements with another FIR filter.

20. The apparatus of claim 17, wherein the digital signal processor is configured to update filter coefficients of the FIR filter using the digital measurements of an overhead portion of a received optical frame and is further configured to use the filter coefficients so updated to recover the data stream from the digital measurements of a payload portion of the received optical frame.

* * * * *